UNITED STATES PATENT OFFICE.

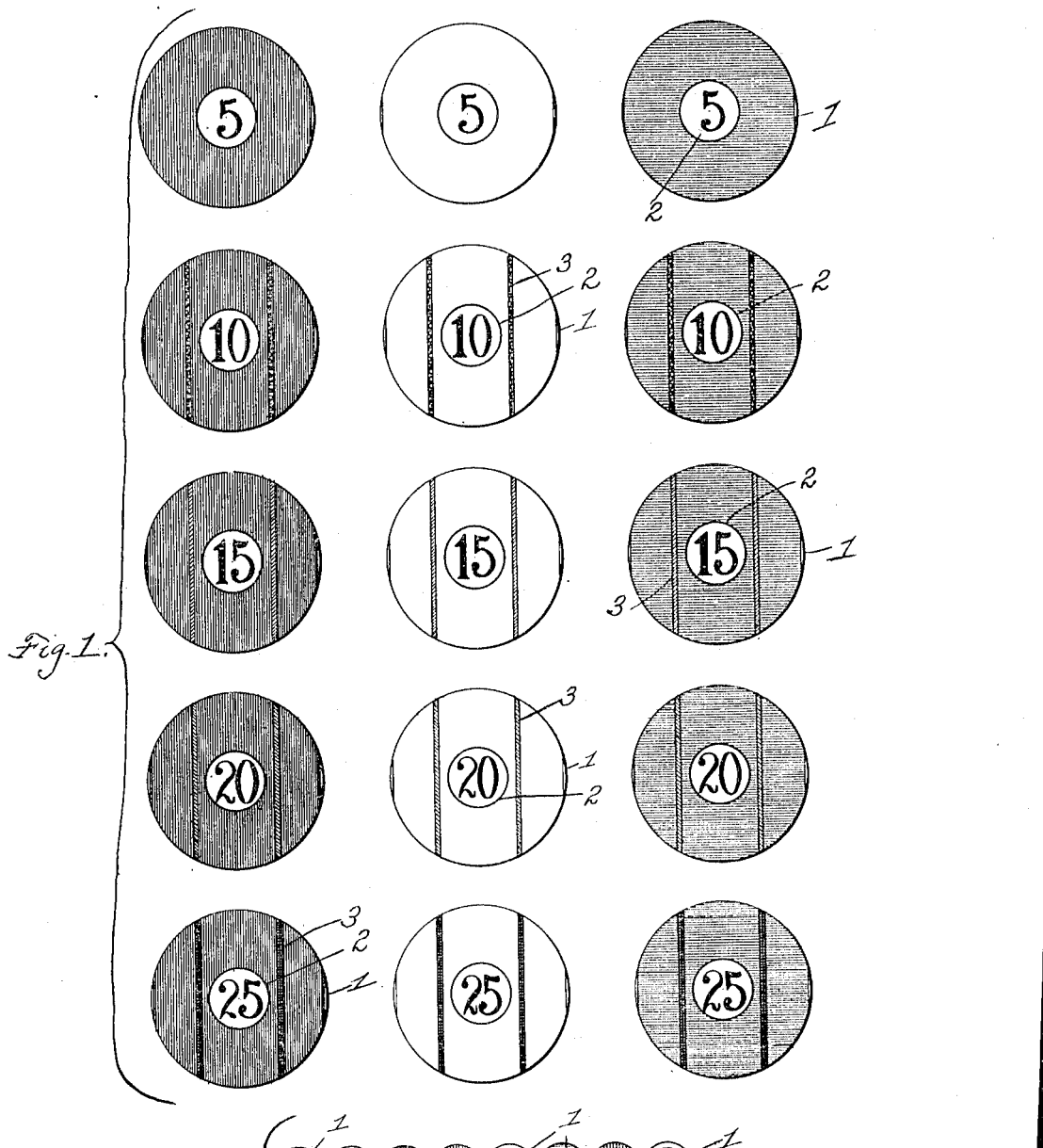

PHILIPPE BIBEAULT, OF WOONSOCKET, RHODE ISLAND.

BALL-GAME APPARATUS.

1,118,727.

Specification of Letters Patent. Patented Nov. 24, 1914.

Application filed April 28, 1914. Serial No. 834,923.

*To all whom it may concern:*

Be it known that I, PHILIPPE BIBEAULT, citizen of the United States, residing at Woonsocket, in the county of Providence and State of Rhode Island, have invented new and useful Improvements in Ball-Game Apparatus, of which the following is a specification.

My present invention pertains to ball-game apparatus; and it contemplates the provision of a set of object balls and a cue ball with which may be played upon a pocket billiard or other suitable table a highly entertaining game.

The invention in all of its details will be fuly understood from the following description and claims when the same are read in connection with the drawings, accompanying and forming part of this specification, in which:

Figure 1 comprises elevations of the fifteen object balls comprised in the preferred embodiment of my invention. Fig. 2 comprises elevations, on a reduced scale, of the fifteen object balls and the cue ball; the elevations of the object balls being taken at right angles to the elevations in Fig. 1 to illustrate the fact that the object balls are numbered 1 to 15 in regular sequence, and that the sequence numerals of each object ball are placed in small circles at opposite sides of the balls and midway between the large circles bearing the group number of the ball.

Similar numerals of reference designate corresponding parts in both views of the drawings.

The cue ball 1ª, Fig. 2, may be a plain white ball or a ball of any other distinctive appearance without affecting my invention.

My invention resides in the plurality of object balls shown in Figs. 1 and 2. These object balls are numbered from 1 to 15 in regular sequence, as illustrated in Fig. 2, the sequence numerals being comparatively small, and being arranged in small circles 1 at diametrically opposite sides of the balls, Fig. 1, and midway between the large circles containing the group members of the balls as hereinafter described.

As shown in Fig. 1, the object balls are divided into five groups of three balls each; the balls of each group being differentiated from the balls in the other groups by the group numbers 5, 10, 15, 20 and 25, respectively, the said group numbers being arranged in large circles 2 at diametrically opposite points on the balls and midway between the before mentioned circles 1. Each of the five groups of object balls comprises, a red ball, a white ball and a blue ball, as conventionally shown in both figures of the drawings. It will also be noticed by reference to Fig. 1 that in addition to the group numbers in the circles or other inclosures 2, the balls of the several groups are differentiated by leaving the balls bearing the lowest group numbers (5) unstriped, while the balls of the other groups are provided with stripes 3 of different colors; the stripes of the balls bearing group numbers 10 being yellow, those of the balls bearing group numbers 15 being purple, those of the balls bearing the grouped numbers 20 being green, and those of the balls bearing the group numbers 25 being black, as conventionally illustrated in Fig. 1.

While I prefer that the three balls in each group be red, white and blue, it is to be understood that said balls may bear any other three colors without involving departure from my claimed invention. It is also to be understood that without affecting my invention, the different numbers of the groups may be other than the numbers 5, 10, 15, 20, and 25; and I would further have it understood that the stripes on the balls in the four lower groups of Fig. 1, may be different from those illustrated and specifically referred to.

My novel object balls can be used for playing any game on a pocket billiard table. They are particularly advantageous, however, because when a ball is pockēted, its color, its sequence number and its group number enter into the amount to be scored, as does also the fact of the color of the stripe or stripes on the ball. The fact that the balls in one group are not striped may also enter into the scoring when desired.

Having described my invention, what I claim and desire to secure by Letters-Patent, is:

1. A game apparatus comprising a set of object balls numbered in regular sequence and divided into groups of balls of different colors; the balls of each group bearing group numbers different from the group numbers of the balls in other groups, and the group number of each ball differing in size from the sequence number thereof.

2. A game apparatus comprising a set of object balls numbered in regular sequence and divided into groups of balls of different colors; the balls of each group bearing group numbers different from the group numbers of the balls in other groups, and the group number of each ball differing in size from the sequence number thereof, and the balls of some of the groups being striped and the stripes of the balls in each group being different in color from the stripes of the balls in the other groups.

In testimony whereof I have hereunto set my hand in presence of two subscribing witnesses.

PHILIPPE BIBEAULT.

Witnesses:
PETER SCHULLER,
EDGAR L. SPAULDING.

Copies of this patent may be obtained for five cents each, by addressing the "Commissioner of Patents, Washington, D. C."